(12) United States Patent
Sasaki

(10) Patent No.: US 9,904,907 B2
(45) Date of Patent: Feb. 27, 2018

(54) AUTHENTICATION APPARATUS WITH CHANGING INTERVAL BETWEEN ADJACENT WORKING TIME PERIODS OF TRANSCEIVER

(71) Applicant: FUJITSU TEN LIMITED, Kobe-shi, Hyogo (JP)

(72) Inventor: Yoshihiro Sasaki, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 15/270,152

(22) Filed: Sep. 20, 2016

(65) Prior Publication Data
US 2017/0092027 A1   Mar. 30, 2017

(30) Foreign Application Priority Data

Sep. 30, 2015   (JP) ................................. 2015-194459

(51) Int. Cl.
| | | |
|---|---|---|
| G06Q 10/10 | (2012.01) | |
| G07B 15/02 | (2011.01) | |
| G07C 9/00 | (2006.01) | |
| H04L 29/08 | (2006.01) | |
| H04L 29/06 | (2006.01) | |
| H04W 64/00 | (2009.01) | |
| H04W 88/02 | (2009.01) | |

(52) U.S. Cl.
CPC ......... *G06Q 10/1093* (2013.01); *G07B 15/02* (2013.01); *G07C 9/00023* (2013.01); *G07C 9/00896* (2013.01); *H04L 67/12* (2013.01); *H04L 67/306* (2013.01); *H04L 67/42* (2013.01); *H04W 64/00* (2013.01); *H04W 88/02* (2013.01)

(58) Field of Classification Search
None
See application file for complete search history.

(56) References Cited

FOREIGN PATENT DOCUMENTS

| | | |
|---|---|---|
| JP | 2003-044572 A | 2/2003 |
| JP | 2003-162576 A | 6/2003 |
| JP | 2008-095422 A | 4/2008 |
| JP | 2011-202362 A | 10/2011 |
| JP | 2012-118848 A | 6/2012 |

*Primary Examiner* — Craig A. Renner
(74) *Attorney, Agent, or Firm* — Oliff PLC

(57) ABSTRACT

In the case where the scheduled use start time has been acquired, the controller shortens the interval between the adjacent working time periods of the transceiver as the scheduled use start time approaches. Thus, in a case where there is a long time before the scheduled use start time, the power consumption is decreased. As the scheduled use start time approaches, the transceiver verifies the user immediately.

20 Claims, 13 Drawing Sheets

|  | REMAINING TIME PERIOD UNTIL RESERVED USE START TIME (331c) | WORKING TIME PERIOD (332c) | STOPPED TIME PERIOD (333c) |
|---|---|---|---|
| P1 | 12 HRS. OR LESS | 10 MIN. | 10 MIN. |
| P2 | 6 HRS. OR LESS | 10 MIN. | 10 MIN. |
| P3 | 3 HRS. OR LESS | 5 MIN. | 5 MIN. |
| P4 | 1 HR. OR LESS | 5 MIN. | 5 MIN. |
| P5 | 30 MIN. OR LESS | 1 MIN. | 1 MIN. |
| P6 | 10 MIN. OR LESS | 30 SEC. | 30 SEC. |
| P7 | 5 MIN. OR LESS | CONTINUOUSLY | NONE |

FIG.3

|  | USER ID NUMBER | VEHICLE NUMBER | START TIME | END TIME |
|---|---|---|---|---|
| L1 | 141255800942 | B10 | 9:00 | 9:30 |
| L2 | 880009129135 | C10 | 13:15 | 14:15 |
| L3 | 377642097114 | C10 | 14:30 | 16:00 |
| L4 | 1449206790022 | A30 | 6:00 | 12:00 |
| L5 | 7789629075691 | S30 | 19:00 | 20:00 |
| L6 | 7789402839721 | Y30 | 21:30 | 22:30 |
| Ln | 2065400852313 | Q45 | 0:15 | 0:45 |

FIG.5

|  | REMAINING TIME PERIOD UNTIL RESERVED USE START TIME (331c) | WORKING TIME PERIOD (332c) | STOPPED TIME PERIOD (333c) |
|---|---|---|---|
| P1 | 12 HRS. OR LESS | 3 MIN. | 10 MIN. |
| P2 | 6 HRS. OR LESS |  | 10 MIN. |
| P3 | 3 HRS. OR LESS |  | 5 MIN. |
| P4 | 1 HR. OR LESS |  | 5 MIN. |
| P5 | 30 MIN. OR LESS |  | 1 MIN. |
| P6 | 10 MIN. OR LESS |  | 30 SEC. |
| P7 | 5 MIN. OR LESS | CONTINUOUSLY | NONE |

FIG.12

|  | REMAINING TIME PERIOD UNTIL RESERVED USE START TIME (331c) | WORKING TIME PERIOD (332c) | STOPPED TIME PERIOD (333c) |
|---|---|---|---|
| P1 | 12 HRS. OR LESS | 30 SEC. | 3 MIN. |
| P2 | 6 HRS. OR LESS | 1 MIN. |  |
| P3 | 3 HRS. OR LESS | 5 MIN. |  |
| P4 | 1 HR. OR LESS | 5 MIN. |  |
| P5 | 30 MIN. OR LESS | 10 MIN. |  |
| P6 | 10 MIN. OR LESS | 10 MIN. |  |
| P7 | 5 MIN. OR LESS | CONTINUOUSLY | NONE |

FIG.13

AUTHENTICATION APPARATUS WITH CHANGING INTERVAL BETWEEN ADJACENT WORKING TIME PERIODS OF TRANSCEIVER

BACKGROUND OF THE INVENTION

Field of the Invention

The invention relates to a technology for authentication to verify a user of an object.

Description of the Background Art

Conventionally, an apparatus has been known that performs authentication to verify whether or not a user is an authorized user for a vehicle or the like that is shared for use. Such an authentication apparatus separately includes a communication apparatus and establishes near field communication with a mobile device owned by the user. Then, the communication apparatus performs authentication to verify the user based on an ID number received by the communication apparatus from the mobile device. Therefore, the authentication apparatus has been continuously working until the user comes close to the vehicle and the like.

However, if the communication apparatus is continuously working, the communication apparatus keeps consuming power even while no communication is established with the user. Therefore, a large amount of power may be consumed. Moreover, it is not necessarily clear when the user comes close to the vehicle and the like to establish communication with a communication apparatus. Therefore, if the communication device stops working, when the user tries to establish communication, authentication is delayed and convenience is decreased.

SUMMARY OF THE INVENTION

According to one aspect of the invention, an authentication apparatus includes a transceiver that performs wireless communications via an antenna and a controller configured to: cause the transceiver to operate intermittently by setting a working time period of the transceiver, the transceiver seeking to obtain verification data of a user during the working time period; and acquire a scheduled use start time of an object associated with the authentication apparatus, the user seeking to use the object. The controller changes an interval between adjacent working time periods of the transceiver depending on whether or not the scheduled use start time has been acquired by the controller.

Thus, since the controller changes the interval between the adjacent working time periods of the transceiver depending on whether or not the scheduled use start time has been acquired, the transceiver can be caused to operate using an appropriate interval.

According to another aspect of the invention, in a case where the scheduled use start time has been acquired by the controller, the controller shortens the interval between the adjacent working time periods of the transceiver as the scheduled use start time approaches.

Thus, in the case where the scheduled use start time has been acquired, the controller shortens the interval between the adjacent working time periods of the transceiver as the scheduled use start time approaches. Thus, in a case where there is a long time before the scheduled use start time, the power consumption is decreased. As the scheduled use start time approaches, the transceiver verifies the user immediately.

Therefore, an object of the invention is to provide a technology for verifying a user of an object immediately while decreasing power consumption.

These and other objects, features, aspects and advantages of the invention will become more apparent from the following detailed description of the invention when taken in conjunction with the accompanying drawings.

BRIEF DESCRIPTION OF THE DRAWINGS

FIG. 3 is an example of an interval table;

FIG. 5 illustrates an example of a reservation management database;

FIG. 12 illustrates an example of a modified interval table;

FIG. 13 illustrates an example of a modified interval table;

DESCRIPTION OF THE EMBODIMENTS

Embodiments of the invention will be described with reference to the drawings.

1. First Embodiment

<1-1. Outline>

Figure 1:
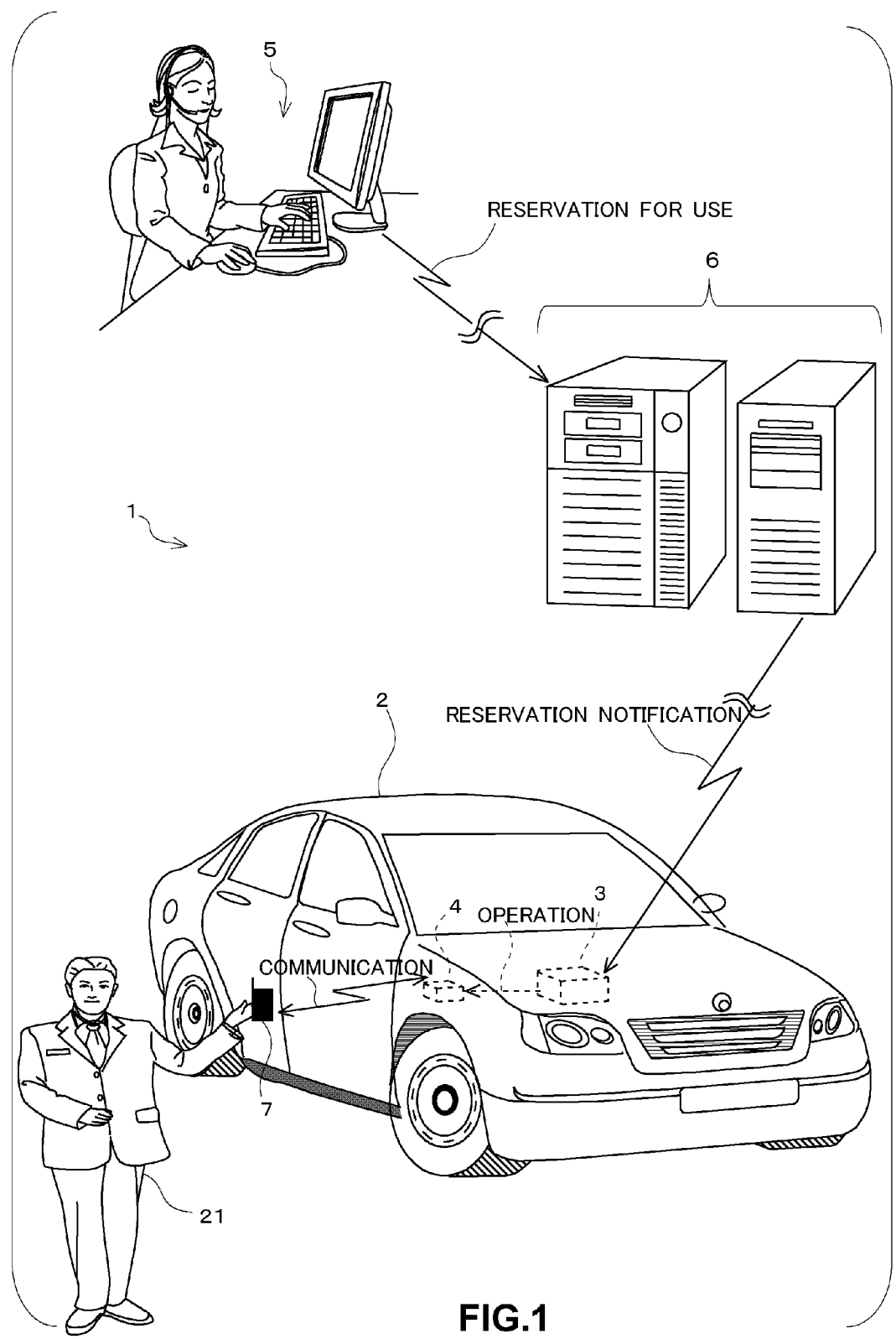
FIG. 1 illustrates an outline of an authentication system.

FIG. 1 illustrates an outline of an authentication system 1. The authentication system 1 is a system that verifies whether or not a user 21 is an authorized user of an object to be shared to use, for example, a vehicle 2 such as a car.

First, the user 21 who desires to use the vehicle 2 makes a reservation to use the vehicle 2 at an office 5 that manages the vehicle 2. The user 21 may access to a reservation system via a mobile device 7 or may visit the office 5 in person, to make a reservation to use the vehicle 2.

Once receiving the reservation of the vehicle 2, the reservation system in the office 5 sends contents of the reservation to a server 6. The contents of the reservation includes a user ID number of the user 21, a vehicle number for identifying the vehicle 2 and a use time period.

The server 6 includes a database including a plurality of the contents of the reservation. Once determining that the user 21 can use the vehicle 2, the server 6 inputs the contents of the reservation into the database. The server 6 sends the user ID number of the user 21 and the use time period to an authentication apparatus 3 included in the vehicle 2.

Once acquiring the user ID number of the user 21 and the use time period, the authentication apparatus 3 causes an authentication communication apparatus 4 to work (operate). The authentication communication apparatus 4 receives the user ID number of the user 21 sent from the mobile device 7 of the user 21.

Once beginning working after receiving power supplied from the authentication apparatus 3, the authentication communication apparatus 4 emits radio waves to a vicinity of the vehicle 2 in a predetermined time cycle. When the user 21 having the mobile device 7 comes closer to the vicinity of the vehicle 2 and when the mobile device 7 receives the radio wave emitted from the authentication communication apparatus 4, the mobile device 7 sends the user ID number of the user 21 included in the mobile device 7 to the authentication communication apparatus 4.

The authentication apparatus 3 receives the user ID number of the mobile device 7 from the authentication communication apparatus 4. The authentication apparatus 3 performs authentication to verify whether or not the user 21 coming closer to the vicinity of the vehicle 2 is an authorized user who made the reservation to use the vehicle 2, by checking the user ID number from the mobile device 7 against the user ID number acquired from the server 6 beforehand. In a case where the authentication apparatus 3 determines that the user 21 is the authorized user, the authentication apparatus 3 allows the user 21 to use the vehicle 2. In other words, the authentication apparatus 3 unlocks a door of the vehicle 2. Thus, the user 21 can enter the vehicle 2 and can start an engine of the vehicle 2, using a key provided in a cabin of the vehicle 2.

As described above, the authentication system 1 performs authentication to verify whether or not the user 21 is the authorized user of the vehicle 2 that is a shared-use vehicle. In a case where the user 21 is the authorized user, the authentication system 1 allows the user 21 to use the vehicle 2. The authentication system 1 eliminates a physical procedure, such as receiving the key of the vehicle 2 between a user and a managing person of the vehicle 2, and enhances convenience of the share-use of the vehicle 2.

<1-2. Configuration>

Figure 2:
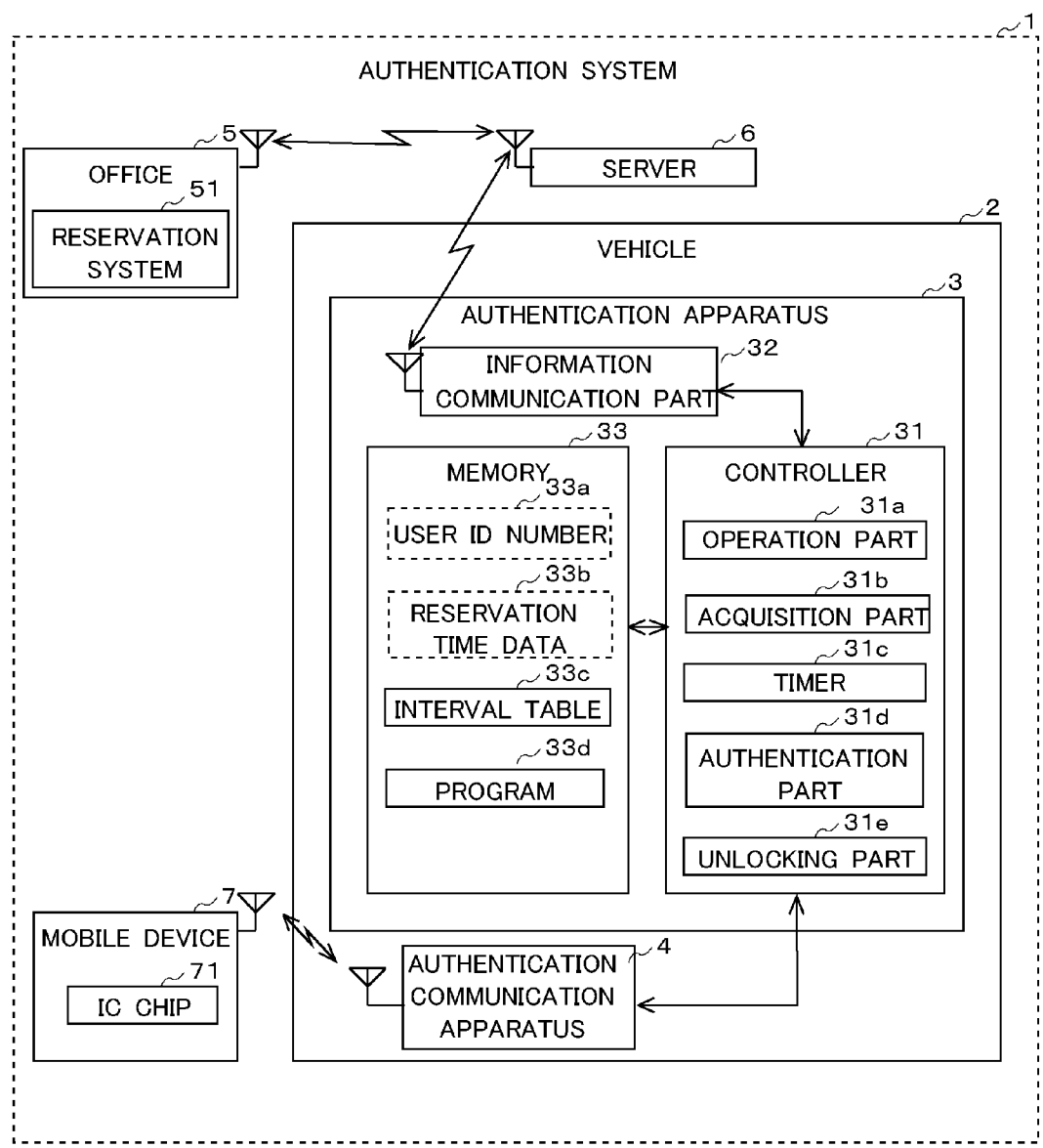
FIG. 2 illustrates a configuration of an authentication apparatus.

FIG. 2 illustrates a configuration of the authentication system 1. More specifically, FIG. 2 illustrates configurations of the authentication apparatus 3 and the authentication communication apparatus 4 of the authentication system 1. The authentication system 1 includes the authentication apparatus 3 and the authentication communication apparatus 4 installed in the vehicle 2, the office 5, the server 6 and the mobile device 7.

The vehicle 2 is an object to be shared to use by a plurality of users. Since only the authorized user is allowed to use the vehicle 2, authentication of a user is performed before use. The object may be a building, such as a house, and an electronic device, such as a personal computer, in addition to a transportation, such as the vehicle 2. The object may be anything that can be shared to use.

The authentication apparatus 3 is installed in the vehicle 2 and is an electronic control apparatus including an antenna for wireless communication to an outside device. The authentication apparatus 3 includes a controller 31, an information communication part 32 and a memory 33.

The controller 31 is a microcomputer including a CPU, a RAM and a ROM, not illustrated. The controller 31 is connected to other elements included in the authentication apparatus 3 and controls the entire authentication apparatus 3. Functions of the controller 31 will be described later.

The information communication part 32 is a wireless communication device including an antenna and a wireless communication function to perform information communications with the server 6 over a network. The information communication part 32 performs the wireless communications over, for example, WiMAX, LTE, etc.

The memory 33 is a memory for storing data. For example, the memory 33 is a non-volatile memory, such as an electrical erasable programmable read-only memory (EEPROM), a flash memory and a hard disk drive including a magnetic disk. The memory 33 stores a user ID number 33a, reservation time data 33b, an interval table 33c and a program 33d.

The user ID number 33a is an identification number for identifying the user of the vehicle 2. For example, the user ID number 33a is a 12-digit figure.

The reservation time data 33b is time data showing use start time and use end time of the vehicle 2 by the user 21. The user ID number 33a and the reservation time data 33b are stored in the memory 33 by an acquisition part 31b. Therefore, if the acquisition part 31b does not acquire the user ID number 33a and the reservation time data 33b, both of the data are not stored in the memory 33. The reservation time data 33b functions as a scheduled use start time of the object.

The interval table 33c is a data table including data of remaining time period until reserved use start time, a working time period and a stopped time period of the authentication communication apparatus 4. A concrete example of the interval table 33c will be described later.

The program 33d is a firmware that is read out by the controller 31, and the program 33d is executed by the controller 31 to control the authentication apparatus 3. The program 33d is input and output to/from the authentication apparatus 3 via a memory, such as a memory card. However, the program 33d may be input and output by connection to an outside device with a communication wire.

Next, functions included in the controller 31 will be described. The controller 31 includes an operation part 31a, the acquisition part 31b, a timer 31c, an authentication part 31d and an unlocking part 31e, as the functions that are implemented according to a program.

The operation part 31a is a controller that causes the authentication communication apparatus 4 to work and to stop. The operation part 31a causes the authentication communication apparatus 4 to work by supplying power to the authentication communication apparatus 4 and stops the authentication communication apparatus 4 by stopping supplying power to the authentication communication apparatus 4. Since the operation part 31a causes the authentication communication apparatus 4 to work and to stop, the authentication communication apparatus 4 works at a predetermined interval, i.e., intermittently. While the operation part 31a stops supplying power to the authentication communication apparatus 4, power is not consumed so that power can be saved.

Moreover, the operation part 31a shortens or lengthens the interval between adjacent work time periods (work period interval) of the authentication communication apparatus 4, by controlling power supply to the authentication communication apparatus 4. In a case where the work period interval is shortened, the operation part 31a shortens a time period (stopped time period) in which the authentication communication apparatus 4 is stopped. Moreover, a time period (working time period) in which the authentication communication apparatus 4 works may be lengthened. In a case where the work period interval is lengthened, the operation part 31a lengthens the stopped time period or shortens the working time period. The operation part 31a functions as an actuator.

The acquisition part 31b receives a various types of data from the server 6 located outside the vehicle 2, via the information communication part 32. The data received by the acquisition part 31b from the server 6 is data relating to the reservation of the vehicle 2. The data relating to the reservation is the user ID number and the reservation time data that is the use start time and the use end time. Once acquiring the data relating to the reservation, the acquisition part 31b stores the user ID number and the reservation time data into the memory 33.

The timer 31c is measuring equipment that measures time. The timer 31c receives signals sent from a positioning system satellite (e.g., GPS satellite) and derives current time from time data included in the received signal. Therefore, the timer 31c derives a time period from the current time to a predetermined time point.

The authentication part 31d performs authentication to verify whether or not the user 21 coming close to the vehicle 2 is a user registered to the authentication apparatus 3 beforehand. In other words, the authentication part 31d determines whether or not the user ID number 33a stored in the memory 33 matches the user ID number of the user 21 sent to the authentication part 31d from the authentication communication apparatus 4, described later, after the authentication communication apparatus 4 acquired the user ID number from the mobile device 7 of the user 21. In a case where those user ID numbers are matched to each other, it can be determined that the user 21 coming closer to the vehicle 2 is the authorized user of the vehicle 2. In this case, the authentication part 31d determines that the authentication succeeded, and turns on an authentication flag of a flag register, not illustrated. On the other hand, in a case where the authentication part 31d determines that those user ID numbers are not matched to each other, the authentication part 31d determines that the authentication failed and turns off the authentication flag. Further, in a case where the user 21 ends the use of the vehicle 2, the authentication part 31d turns off the authentication flag.

The unlocking part 31e is a controller that controls unlocking and locking of the door of the vehicle 2. In a case where the unlocking part 31e determines that the authentication flag is turned on while looking up the authentication flag, the unlocking part 31e unlocks the door of the vehicle 2. In this embodiment, the key to start the vehicle 2 is installed in the vehicle 2 beforehand. Therefore, when the user 21 is verified as the authorized user by the authentication part 31d and when the door of the vehicle 2 is unlocked by the unlocking part 31e, the user 21 can enter the vehicle 2 and can start the vehicle 2 with the key in the vehicle 2.

The authentication communication apparatus 4 is a wireless communication device that receives the user ID number sent from a mobile device located in the vicinity of the vehicle 2. The authentication communication apparatus 4 is connected to the authentication apparatus 3 by the communication wire, and sends the received user ID number to the authentication apparatus 3. The authentication communication apparatus 4 functions as a communication device.

The authentication communication apparatus 4 works by power supplied from the authentication apparatus 3. Once starting working, the authentication communication apparatus 4 transmits radio waves to a transmission range of approx. 70 cm or 100 cm, i.e., the vicinity of the vehicle 2, at a predetermined time cycle. A frequency of the radio waves is, for example, 300 MHz. When the mobile device 7 is located within the transmission range of the authentication communication apparatus 4 and receives the radio waves transmitted by the authentication communication apparatus 4, the mobile device 7 sends the user ID number included in the mobile device 7 to the authentication communication apparatus 4. Once receiving the user ID number from the mobile device 7, the authentication communication apparatus 4 sends the user ID number received from the mobile device 7 to the authentication apparatus 3 connected by the communication wire. In other words, the authentication communication apparatus 4 seeks to obtain verification data of a user during the working time period.

Since the authentication communication apparatus 4 works by the power supplied by the authentication apparatus 3, the power is not consumed while the power is not supplied. Therefore, in a case where the mobile device 7 is not within the transmission range of the authentication communication apparatus 4, i.e., in a case where there are still many hours until the scheduled time for the user 21 to use the vehicle 2, it is recommended that power should not be supplied to reduce the power consumption.

The office 5 is an organization that manages the vehicle 2. Some among examples of the office 5 are a taxi company, a trucking company that owns trucks and a construction company that owns construction machinery. In this case, the vehicle 2 is a tax, a truck and construction machinery. The office 5 includes a reservation system 51 for reservation to use the vehicle 2.

The reservation system 51 receives a request of the reservation to use the vehicle 2 from the user 21, and sends, to the server 6, data relating to the reservation to use the vehicle 2. The user 21 inputs to the reservation system 51, the user ID number, the vehicle number and reservation time that is the use start time and the use end time when making the request of the reservation to use the vehicle 2.

The server 6 is a large-sized computer that communicates data and the like with another computer over an information network. A configuration of the server 6 will be described later.

The mobile device 7 is carried by the user 21 and is a portable electronic device for wireless communications. For example, the mobile device 7 is a cell phone and a smartphone. Moreover, the mobile device 7 may be a card shaped device. The mobile device 7 includes an IC chip 71.

The IC chip 71 stores the user ID number that is an ID number specific to the user 21 who is an owner of the mobile device 7. Once receiving radio waves for authentication from the authentication communication apparatus 4, the mobile device 7 reads out the user ID number from the IC chip 71 and sends the read-out user ID number to the authentication communication apparatus 4.

FIG. 3 is an example of the interval table 33c. The interval table 33c is a data table including a plurality of interval pattern data sets P that are interval pattern data sets P1 to P7. Each of the plurality of interval pattern data sets P includes data of the remaining time period until the reserved use start time, and the working time period and the stopped time period of the authentication communication apparatus 4. The plurality of interval pattern data sets P are data showing that as the remaining time period until the reserved use start time becomes shorter, the working time period and the stopped time period of the authentication communication apparatus 4 become shorter.

For example, the interval pattern data set P1 shows the working time period (ten minutes) and the stopped time period (ten minutes) of the authentication communication apparatus 4 in a case where the remaining time period until the reserved use start time is twelve hours or less and exceeds six hours. Moreover, the interval pattern data set P4 shows the working time period (five minutes) and the stopped time period (five minutes) of the authentication communication apparatus 4 in a case where the remaining time period until the reserved use start time is one hour or less and exceeds thirty minutes. Moreover, the interval pattern data set P6 shows the working time period (thirty seconds) and the stopped time period (thirty seconds) of the authentication communication apparatus 4 in a case where the remaining time period until the reserved use start time is ten minutes or less and exceeds five minutes. Based on the plurality of interval pattern data sets P, an interval between the adjacent working time periods of the authentication communication apparatus 4 is shortened as the scheduled use start time of using the vehicle 2 approaches.

The authentication communication apparatus 4 is caused to work several hours before the reserved use start time partly to confirm whether or not the authentication communication apparatus 4 works properly, and also to prepare a case where a need of using the vehicle 2 suddenly arises due to change in schedule of a user. In other words, the authentication communication apparatus 4 receives the user ID number of the user who suddenly desires to use the vehicle 2 and sends the user ID number to the server 6 so that the server 6 can determine whether or not the vehicle 2 can be used. If there is no schedule conflicting with schedule of another user who will use the vehicle 2 and also if the user ID number is effective, a request to use the vehicle 2 can be accepted without the reservation to use the vehicle 2. Therefore, even if there are still some hours before the reserved use start time, it is useful to cause the authentication communication apparatus 4 to work.

If the remaining time period until the reserved use start time is determined to correspond to the interval pattern data set P1, the operation part 31a of the authentication apparatus 3 causes the authentication communication apparatus 4 to work for thirty minutes and then to stop for thirty minutes. In this case, as compared to a case where the authentication communication apparatus 4 is caused to work continuously, the power consumption can be halved.

Since the authentication communication apparatus 4 is caused to work based on the interval table 33c, the authentication communication apparatus 4 is caused to work intermittently. Moreover, as a predetermined time (time point) approaches, the interval between the adjacent working time periods of the authentication communication apparatus 4 can be shorter.

Figure 4:
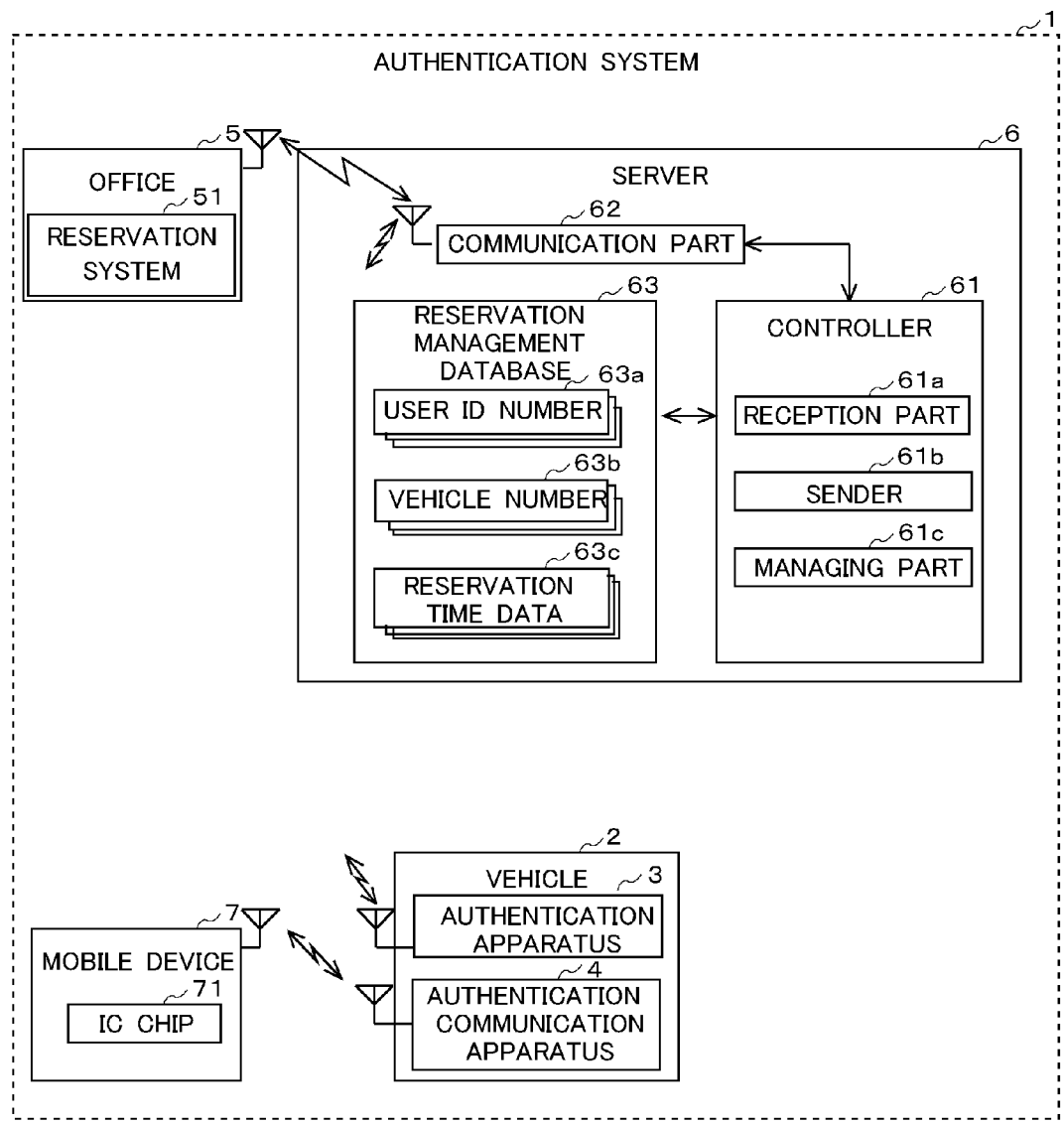
FIG. 4 illustrates a configuration of a server.

FIG. 4 illustrates a block diagram showing the configuration of the server 6. The server 6 includes a controller 61, a communication part 62 and a reservation management database 63.

The controller 61 is a microcomputer including a CPU, a RAM and a ROM, not illustrated. The controller 61 is connected to other elements included in the server 6, and controls the entire server 6. Functions included in the controller 61 will be described later.

The communication part 62 is a wireless communication device including an antenna and a wireless communication function to perform information communications to the authentication apparatus 3 and the office 5 over the network. The communication function is executed using, for example, WiMAX, LTE, etc. A service that sends and receives a text message may be used.

The reservation management database 63 is a database including data of a user ID number 63a, a vehicle number 63b and reservation time data 63c. In addition to the data of the user ID number 63a and others, the reservation management database 63 includes various types of data, not illustrated, that is used for reservation management. A detailed example of the reservation management database 63 will be described later.

The user ID number 63a is an identification number for identifying the user of the vehicle 2. For example, the user ID number 63a is a 12-digit figure.

The vehicle number 63b is data that consists of codes and figures for identifying one vehicle from a plurality of vehicles. The vehicle number 63b is, for example, "B10."

The reservation time data 63c shows time for which the vehicle 2 is reserved. The reservation time data 63c includes the use start time and the use end time. The use start time is, for example, "9:00," and the use end time is, for example, "9:30."

Next, the functions of the controller 61 will be described. The controller 61 includes a reception part 61a, a sender 61b and a managing part 61c, as functions that are implemented according to a program.

The reception part 61a receives the reservation to use the vehicle 2 that is sent from the office 5. The reservation to use the vehicle 2 is data including the user ID number 63a, the vehicle number 63b and the reservation time data 63c.

The sender 61b sends the reservation to use the vehicle 2 received by the reception part 61a, to the authentication apparatus 3 of the vehicle 2 via the communication part 62.

The managing part 61c manages the reservation to use the vehicle 2 received by the reception part 61a based on the reservation management database 63. In other words, once the reception part 61a receives the reservation to use the vehicle 2, the managing part 61c stores data of the reservation to use the vehicle 2 into the reservation management database 63, and when use of the vehicle 2 ends, the managing part 61c erases the data of the reservation to use the vehicle 2 from the reservation management database 63. The managing part 61c manages to keep reservations in the reservation management database 63 updated.

FIG. 5 illustrates an example of the reservation management database 63. The reservation management database 63 is a data table including a plurality of data records L that are data records L1 to Ln. Each of the plurality of data records L includes the user ID number 63a, the vehicle number 63b and the reservation time data 63c. The reservation time data 63c includes start time 631c and end time 632c.

For example, the data record L1 includes "141255800942" as the user ID number 63a, "B10" as the vehicle number 63b, "9:00" as the start time 631c and "9:30" as the end time 632c.

The plurality of data records L of the reservation management database 63 are stored, updated and erased by the managing part 61c. Latest reservations can be understood by looking up the reservation management database 63.

<1-3. Steps>

Figure 6:
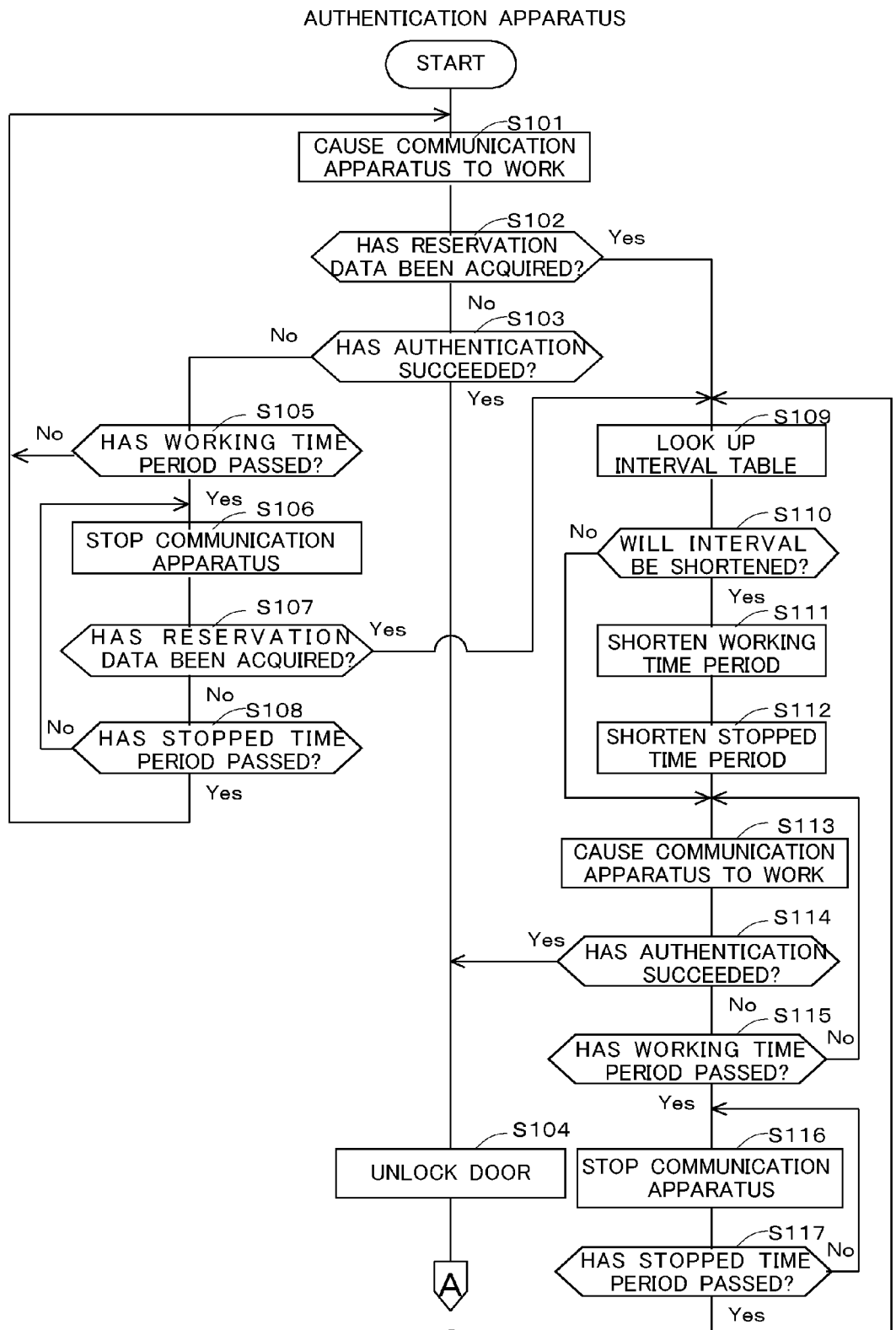
FIG. 6 illustrates steps of a process performed by the authentication apparatus.

Next, steps of a process performed by the authentication apparatus 3 will be described. FIG. 6 illustrates a flowchart showing the steps of the process performed by the authentication apparatus 3. The process is repeatedly performed in a predetermined time cycle.

When the process starts, the operation part 31a causes the authentication communication apparatus 4 to work (a step S101). As described above, the operation part 31a causes the authentication communication apparatus 4 to work by supplying power to the authentication communication apparatus 4.

Once the operation part 31a causes the authentication communication apparatus 4 to work, the acquisition part 31b determines whether or not reservation data has been acquired (a step S102). The acquisition part 31b looks up the memory 33. In a case where the user ID number 33a and the reservation time data 33b are stored in the memory 33, the acquisition part 31b determines that the reservation data has been acquired. On the other hand, in a case where the user ID number 33a and the reservation time data 33b are not stored in the memory 33, the acquisition part 31b determines that the reservation data has not been acquired.

In a case where the acquisition part 31b determines that the reservation data has not been acquired (No in the step S102), the authentication part 31d performs authentication to verify a user of the vehicle 2 (a step S103). The authentication part 31d checks the user ID number 33a stored in the memory 33 against the user ID number sent by the authentication communication apparatus 4 to the authentication apparatus 3 to perform authentication to verify the user of the vehicle 2. In other words, in a case where the user ID number 33a stored in the memory 33 is the same as the user ID number sent by the authentication communication apparatus 4 to the authentication apparatus 3, the authentication part 31d determines that the authentication succeeded. In a case where the user ID number 33a stored in the memory 33 is not the same as the user ID number sent by the authentication communication apparatus 4 to the authentication apparatus 3, the authentication part 31d determines that the authentication has failed.

In a case where the authentication part 31d determines that the authentication has succeeded (Yes in the step S103), the unlocking part 31e unlocks the door of the vehicle 2 (a step S104). Thus, the user 21 who made the reservation to use the vehicle 2 beforehand can enter the vehicle 2 and can use the vehicle 2.

On the other hand, in a case where the authentication part 31d determines that the authentication has failed (No in the step S103), the timer 31c determines whether or not the working time period has passed since the operation part 31a causes the authentication communication apparatus 4 to work (a step S105). The timer 31c looks up the interval table 33c in the memory 33 and sets a working time period corresponding to a remaining time period 331c until the reserved use start time, as a working time period 332c.

In a case where the timer 31c determines that the working time period has not passed (No in the step S105), the process returns to the step S101. In other words, the operation part 31a keeps the authentication communication apparatus 4 working, and the steps 102 and after are performed again.

On the other hand, in a case where the timer 31c determines that the working time period has passed (Yes in the step S105), the operation part 31a stops supplying power to the authentication communication apparatus 4 to stop the authentication communication apparatus 4 (a step S106).

Once the operation part 31a stops the authentication communication apparatus 4, the acquisition part 31b determines whether or not the reservation data has been acquired (a step S107). The acquisition part 31b determines in the step S102 whether or not the reservation data has been acquired while the authentication communication apparatus 4 is working. In addition, the acquisition part 31b also determines whether or not the reservation data has been acquired in the step S107 while the authentication communication apparatus 4 is stopped. Thus, it is possible to speedily move to a step of shortening the working time period and the stopped time period, described later.

In a case where the acquisition part 31b determines that the reservation data has not been acquired (No in the step S107), the timer 31c determines whether or not the stopped time period has passed (a step S108). The timer 31c looks up the interval table 33c in the memory 33 and sets a stopped time period corresponding to the remaining time period 331c until the reserved use start time, as a stopped time period 333c. Supplying power to the authentication communication apparatus 4 is stopped until the stopped time period passes.

Thus, power consumption can be reduced for a time period from time at which the reservation to use the vehicle 2 has been made to the use start time of the vehicle 2. When there is enough time until the use start time, even if power supply to the authentication communication apparatus 4 is stopped, i.e., even if there is a time period in which authentication to verify a user is not performed, convenience of using vehicle is not reduced because there is a low possibility that the user immediately uses the vehicle in such a period.

In a case where the timer 31c determines that the stopped time period has passed (Yes in the step S108), the process returns to the step S101. In other words, the operation part 31a causes the authentication communication apparatus 4 to work, and then the step S102 and after are performed again. As described above, since the operation part 31a repeatedly causes the authentication communication apparatus 4 to work and to stop, the operation part 31a intermittently and regularly causes the authentication communication apparatus 4 to work. Since the operation part 31a intermittently and regularly causes the authentication communication apparatus 4 to work, the power consumption can be stably reduced in a planned manner. Moreover, since the authentication communication apparatus 4 is caused to work for the predetermined time periods, even in a case where a user originally had no schedule to use the vehicle 2 but suddenly desires to use the vehicle 2 due to change of the schedule, it is possible to use the vehicle 2.

On the other hand, in a case where the timer 31c determines that the stopped time period has not passed (No in the step S108), the process returns to the step S106 and the operation part 31a keeps stopping the authentication communication apparatus 4. While the timer 31c determines that the stopped time period has not passed, the steps S106, S107 and S108 are repeatedly performed.

Next described is a process in which the acquisition part 31b acquires the reservation data and shortens the working time period and the stopped time period of the authentication communication apparatus 4. In the foregoing process, in the case where the acquisition part 31b determines that the reservation data has been acquired (Yes in the steps S102 and S107), the timer 31c looks up the interval table 33c in the memory 33 (a step S109).

Once looking up the interval table 33c, the timer 31c determines whether to shorten the working time period and the stopped time period of the authentication communication apparatus 4, i.e., whether to shorten an interval between the adjacent working time periods of the authentication communication apparatus 4 (a step S110). The timer 31c determines whether to shorten those time periods based on the remaining time period 331c until the reserved use start time and on the working time period 332c and the stopped time period 333c in the interval table 33c.

For example, in the interval table 33c in FIG. 3, in a case where an appropriate interval pattern data set has been changed from the interval pattern data set P2 to the interval pattern data set P3 as a result of decrease in the remaining time period 331c until the reserved use start time from six hours to three hours, the timer 31c determines to shorten the working time period 332c and the stopped time period 333c from ten minutes shown in the interval pattern data set P2 to five minutes shown in the interval pattern data set P3.

In a case where the timer 31c determines to shorten the working time period and the stopped time period (Yes in the step S110), the timer 31c shortens the working time period and the stopped time period based on the interval table 33c (steps S111 and S112).

In a case where the timer 31c determines not to shorten the working time period and the stopped time period (No in the step S110) or where the timer 31c shortens the working time period and the stopped time period, the operation part 31a causes the authentication communication apparatus 4 to work (a step S113).

Once the operation part 31a causes the authentication communication apparatus 4 to work, the authentication part 31d performs authentication to verify the user of the vehicle 2 in the foregoing method (a step S114).

In a case where the authentication part 31d determines that the authentication has succeeded (Yes in the step S114), the unlocking part 31e unlocks the door of the vehicle 2 (the step S104).

On the other hand, in a case where the authentication part 31d determines that the authentication has failed (No in the step S114), the timer 31c determines whether or not the working time period has passed since the operation part 31a causes the authentication communication apparatus 4 to work (a step S115). In a case where the working time period has been shortened because the step S111 has been executed, the operation part 31a determines whether or not the shortened working time period has passed.

In a case where the timer 31c determines that the working time period has not passed (No in the step S115), the process returns to the step S113, and the operation part 31a keeps the authentication communication apparatus 4 working. Until the timer 31c determines that the stopped time period has passed, the steps S113, S114 and S115 are repeatedly performed.

In a case where the timer 31c determines that the working time period has passed (Yes in the step S115), the operation part 31a stops the authentication communication apparatus 4 (a step S116).

Once the operation part 31a stops the authentication communication apparatus 4, the timer 31c determines whether or not the stopped time period has passed since the operation part 31a stopped the authentication communication apparatus 4 (a step S117). In a case where the step S112 has been performed and thus the stopped time period has been shortened, the operation part 31a determines whether or not the shortened stopped time period has passed.

In a case where the timer 31c determines that the stopped time period has not passed (No in the step S117), the process returns to the step S116 and the operation part 31a keeps stopping the authentication communication apparatus 4. Until the timer 31c determines that the stopped time period has passed, the steps S116 and S117 are repeatedly performed.

In a case where the timer 31c determines that the stopped time period has passed (Yes in the step S117), the process returns to the step S109 and then the step S109 and after are performed again.

As described above, based on whether or not the reservation data has been acquired by the authentication apparatus 3 from the server 6, the interval between the adjacent working time periods of the authentication communication apparatus 4 can be changed. Especially, in a case where the reservation data has been acquired, as the scheduled use start time of the vehicle 2 approaches, the authentication apparatus 3 shortens the interval between the adjacent working time periods of the authentication communication apparatus 4 based on the interval table 33c. On the other hand, in a case where the reservation data has not been acquired, the authentication apparatus 3 is configured to cause the authentication communication apparatus 4 to work at a constant interval, i.e. intermittently.

Figure 7:
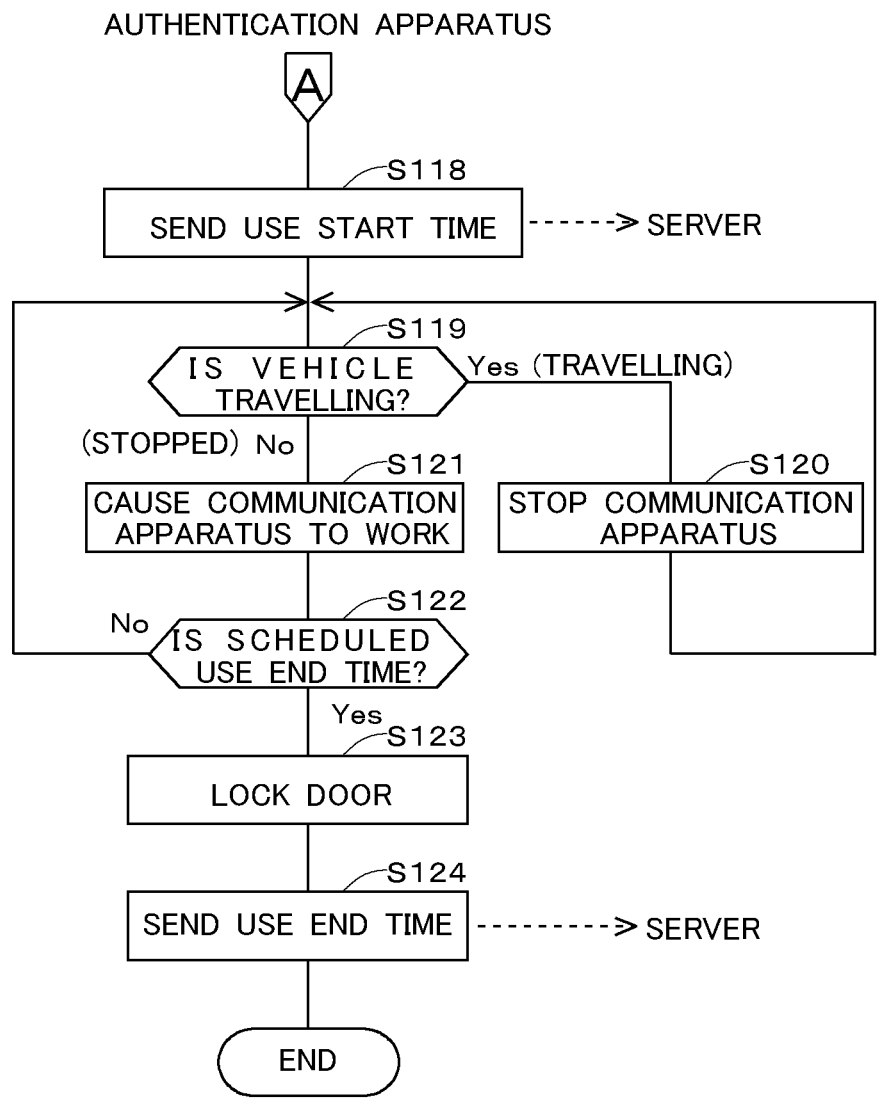
FIG. 7 illustrates steps of a process performed by the authentication apparatus.

Next described are steps of a process that is performed after the door of the vehicle 2 is unlocked by the unlocking part 31e in the step S104. FIG. 7 illustrates a flowchart showing the steps of the process after the door of the vehicle 2 is unlocked by the unlocking part 31e.

Once the unlocking part 31e unlocks the door of the vehicle 2, the acquisition part 31b sends, to the server 6, time at which the door has been unlocked, i.e., time at which the user started using the vehicle 2 (use start time) (a step S118). Once receiving the time, the server 6 updates the reservation management database 63. It is possible to understand the time at which use of the vehicle 2 has been started, by looking up the updated reservation management database 63.

Once the acquisition part 31b sends the use start time, the operation part 31a determines whether or not the vehicle 2 is travelling (a step S119).

In a case where the operation part 31a determines that the vehicle 2 is travelling (Yes in the step S119), the operation part 31a stops the authentication communication apparatus 4 (a step S120) to decrease the power consumption during travelling because there is no need of the authentication process during travelling. Once the operation part 31a stops the authentication communication apparatus 4, the steps are performed again from S119.

In a case where the operation part 31a determines that the vehicle 2 is not travelling, i.e., that the vehicle 2 is stopped (No in the step S119), the operation part 31a causes the authentication communication apparatus 4 to work (a step S121). In the case where the vehicle 2 is stopped, the user may be temporarily outside the vehicle 2 for shopping, sightseeing, etc. In this case, the operation part 31a stands by, keeping the authentication communication apparatus 4 working until the user returns to the vehicle 2 and performs authentication.

Once the operation part 31a causes the authentication communication apparatus 4 to work, the timer 31c looks up the reservation time data 33b in the memory 33 to determine whether or not a scheduled use end time has arrived (a step S122).

In a case where the timer 31c determines that the scheduled use end time has not arrived (No in the step S122), the step S119 and after are performed again. The steps S119 to S122 are repeatedly performed until the vehicle 2 is stopped and the scheduled use end time arrives.

On the other hand, in a case where the timer 31c determines that the scheduled use end time has arrived (Yes in the step S122), the unlocking part 31e locks the door of the vehicle 2 (a step S123). In a case where the vehicle 2 is stopped and also where the scheduled use end time has arrived, it can be determined that the user returns the vehicle 2 to a predetermined return place.

Once the unlocking part 31e locks the door of the vehicle 2, the acquisition part 31b sends to the server 6 time at which the door has been locked, i.e., time at which the user ended to use the vehicle 2 (use end time) (a step S124). Once receiving the time, the server 6 updates the reservation management database 63. It is possible to understand the time at which use of the vehicle 2 has been ended, by looking up the updated reservation management database 63. Once the acquisition part 31b sends the use end time to the server 6, the process ends.

Figure 8:
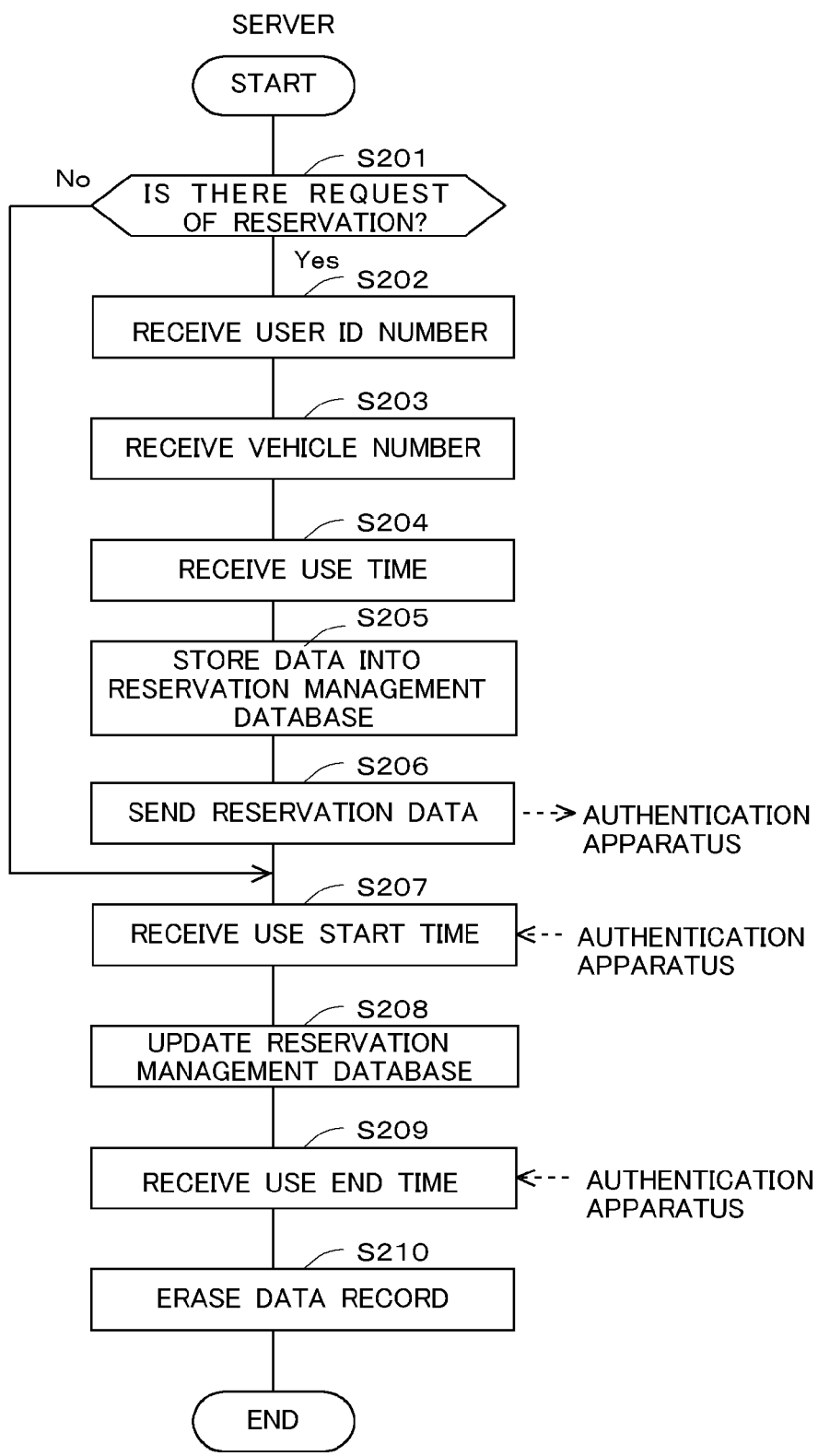
FIG. 8 illustrates steps of a process performed by the server.

Next, a process performed by the server 6 will be described. FIG. 8 illustrates a flowchart showing steps of the process performed by the server 6. The process are repeated at a predetermine time cycle.

Once the process starts, the reception part 61a determines whether or not a request of the reservation to use the vehicle 2 is present, based on the reservation system 51 in the office 5 (a step S201).

In a case where the reception part 61a determines that the request of the reservation to use the vehicle 2 is present (Yes in the step S201), the reception part 61a receives the user ID number, the vehicle number and the reservation time that is the use start time and the use end time included in the request of the reservation to use the vehicle 2 (steps S202, S203 and S204).

Once the reception part 61a receives the user ID number, etc., the managing part 61c stores the user ID number, the vehicle number and the reservation time received by the reception part 61a into the reservation management database 63 (a step S205).

Once the managing part 61c stores the user ID number, etc. into the reservation management database 63, the sender 61b identifies the authentication apparatus 3 installed in a vehicle corresponding to the vehicle number. The sender 61b sends, to the identified authentication apparatus 3, the reservation data including received data (a step S206).

In a case where the reception part 61a determines that the request of the reservation to use the vehicle 2 is not present in the step S201 based on the reservation system 51 in the office 5 (No in the step S201), or in a case where the sender 61b sends the reservation data to the authentication apparatus 3 in the step S206, the reception part 61a receives the use start time of the vehicle 2 sent from the authentication apparatus 3 (a step S207).

Once the reception part 61a receives the use start time and the use end time, the managing part 61c stores the two received time and updates the reservation management database 63 (a step S208).

Once the managing part 61c updates the reservation management database 63, the reception part 61a receives the use end time of the vehicle 2 sent from the authentication apparatus 3 (a step S209).

Once the reception part 61a receives the use end time, the managing part 61c erases the data record L corresponding to the received use end time from the reservation management database 63 (a step S210) to keep the reservations in the reservation management database 63 updated.

As described above, the server 6 receives the data relating to the reservation from the reservation system 51 in the office 5 and also receives the use start time and the use end time from the authentication apparatus 3. Since the server 6 stores, updates and erases the data in/from the reservation management database 63, the latest reservations can be always understood by looking up the reservation management database 63.

As described above, the authentication apparatus 3 in the first embodiment changes the interval between the adjacent working time periods of the authentication communication apparatus 4, depending on whether or not the reservation time data 33b to use the vehicle 2 has been acquired. Thus, the authentication communication apparatus 4 is caused to work at an appropriate interval. In other words, power can be supplied to the authentication communication apparatus 4 at the appropriate interval.

Moreover, in the case where the reservation time data 33b has been acquired, the operation part 31a shortens the interval between the adjacent working time periods of the authentication communication apparatus 4 as the start time 631c of scheduled use of the vehicle 2 approaches. Thus, in a case where there is a long time before the start time 631c of the scheduled use of the vehicle 2, the power consumption is decreased. On the other hand, as the start time 631c of the scheduled use of the vehicle 2 approaches, the authentication apparatus 3 is configured to verify the user 21 more immediately.

Moreover, in the case where the reservation time data 33b has not been acquired, the operation part 31a causes the authentication communication apparatus 4 to work intermittently. Thus, in a case where the vehicle 2 is surely used, while the power consumption is decreased, as the start time 631c of the scheduled use of the vehicle 2 approaches, the authentication apparatus 3 is configured to verify the user 21 immediately. Further, in a case where there is no schedule to use the vehicle 2, the power consumption is decreased. However, if the schedule is changed, the authentication can be performed.

2. Second Embodiment

<2-1. Outline>

In the foregoing first embodiment, in the case where the reservation time data 33b has been acquired, as the start time 631c of the scheduled use of the vehicle 2 approaches, the interval between the adjacent working time periods of the authentication communication apparatus 4 is shortened. Moreover, in the case where the reservation time data 33b has not been acquired, the authentication communication apparatus 4 is caused to work intermittently.

On the other hand, in a second embodiment, in a case where reservation time data 33b has been acquired, an authentication communication apparatus 4 is kept working continuously. Moreover, in a case where the reservation time data 33b has not been acquired, the authentication communication apparatus 4 is caused to work intermittently.

Thus, in a case where the reservation time data 33b has been acquired and where a vehicle 2 is surely used, an authentication apparatus 3 is configured to verify a user 21 immediately. In a case where there is no schedule to use the vehicle 2, the power consumption is decreased. However, the authentication can be performed if the schedule is changed. A configuration and a process of the second embodiment partially include the configuration and the process of the first embodiment. Therefore, differences from the first embodiment will be mainly described below.

<2-2. Configuration>

A configuration of the authentication apparatus 3 in the second embodiment is the same as the configuration in the first embodiment. Therefore, the configuration of the authentication apparatus 3 in the second embodiment will not be described or illustrated.

<2-3. Process>

Figure 9:
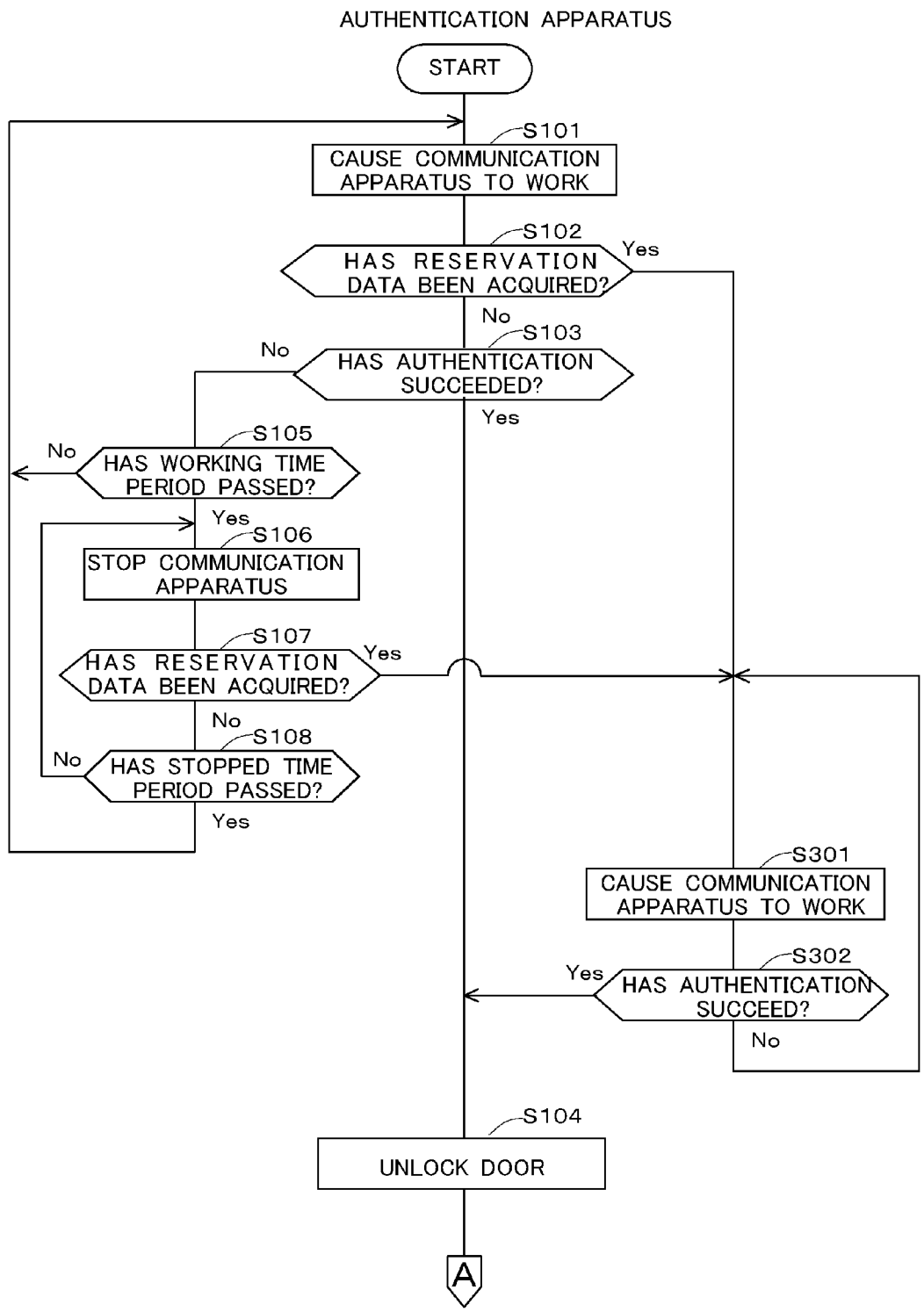
FIG. 9 illustrates steps of a process performed by the authentication apparatus in a second embodiment.

FIG. 9 illustrates a flowchart showing steps of the process performed by the authentication apparatus 3 in the second embodiment. The steps of the process in the second embodiment include steps S301 and S302, instead of the steps S109 to S117 in the steps of the process in the first embodiment. Therefore, the steps S301 and S302 will be mainly described below.

In the step S102 or the step S107, in a case where an acquisition part 31b determines that the reservation data has been acquired, the operation part 31a causes the authentication communication apparatus 4 to work.

Once the operation part 31a causes the authentication communication apparatus 4 to work, an authentication part 31d performs authentication to verify a user of the vehicle 2 in the same method used in the first embodiment (the step S302).

In a case where the authentication part 31d determines that the authentication has succeeded (Yes in the step S302), an unlocking part 31e unlocks a door of the vehicle 2 (the step S104).

On the other hand, in a case where the authentication part 31d determines that the authentication has failed (No in the step S302), the step S301 is performed again, and the operation part 31a keeps the authentication communication apparatus 4 working. The operation part 31a keep the authentication communication apparatus 4 working until the authentication part 31d determines that the authentication succeeded. In other words, the operation part 31a keeps the authentication communication apparatus 4 working continuously. In a case where the acquisition part 31b determines that the reservation data has not been acquired, the operation part 31a alternately causes the authentication communication apparatus 4 to work and stop. In other words, the operation part 31a causes the authentication communication apparatus 4 to work intermittently.

As described above, the authentication apparatus 3 in the second embodiment switches between a constant operation and an intermittent operation of the authentication communication apparatus 4, depending on whether presence and absence of the reservation time data 33b. Thus, in a case where the reservation time data 33b has been acquired and where the vehicle 2 is surely used, the authentication apparatus 3 is configured to verify the user 21 immediately. Moreover, in a case where there is no schedule to use the vehicle 2, the power consumption is decreased by the intermittent operation. However, if the schedule is changed, the authentication can be performed.

3. Third Embodiment

<3-1. Outline>

In a third embodiment, in a case where schedule data has been acquired, an operation part 31a causes an authentication communication apparatus 4 to work using a first interval. Moreover, in a case where the schedule data has not been acquired, the operation part 31a causes the authentication communication apparatus 4 to work using a second interval longer than the first interval.

Thus, in a case where the vehicle 2 is surely used, while the power consumption is decreased, an authentication apparatus 3 is configured to verify the user 21 immediately. Further, in a case where there is no schedule to use the vehicle 2, the power consumption is decreased. However, if the schedule is changed, the authentication can be performed. A configuration and a process of the third embodiment partially include the configuration and the process of the first embodiment. Therefore, differences from the first embodiment will be mainly described below.

<3-2. Configuration>

Figure 10:
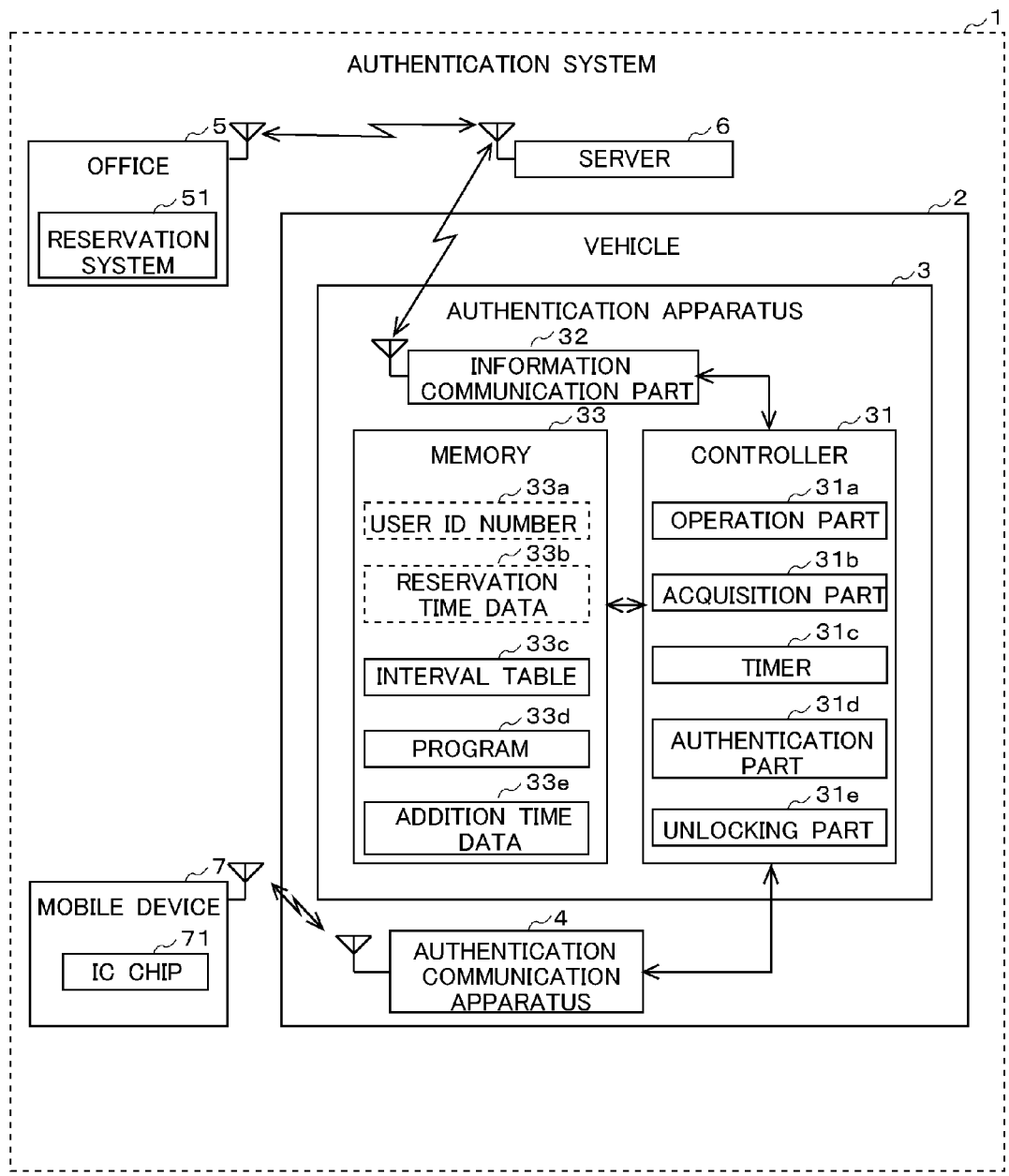
FIG. 10 illustrates a configuration of an authentication apparatus in a third embodiment.

FIG. 10 illustrates a block diagram of the authentication apparatus 3 in the third embodiment. In addition to the configuration in the first embodiment, a memory 33 of the authentication apparatus 3 in the third embodiment further stores addition time data 33e.

The addition time data 33e is a plurality of time data, for example, five minutes and three minutes, to extend the working time period and the stopped time period of the authentication communication apparatus 4.

<3-3. Process>

Figure 11:
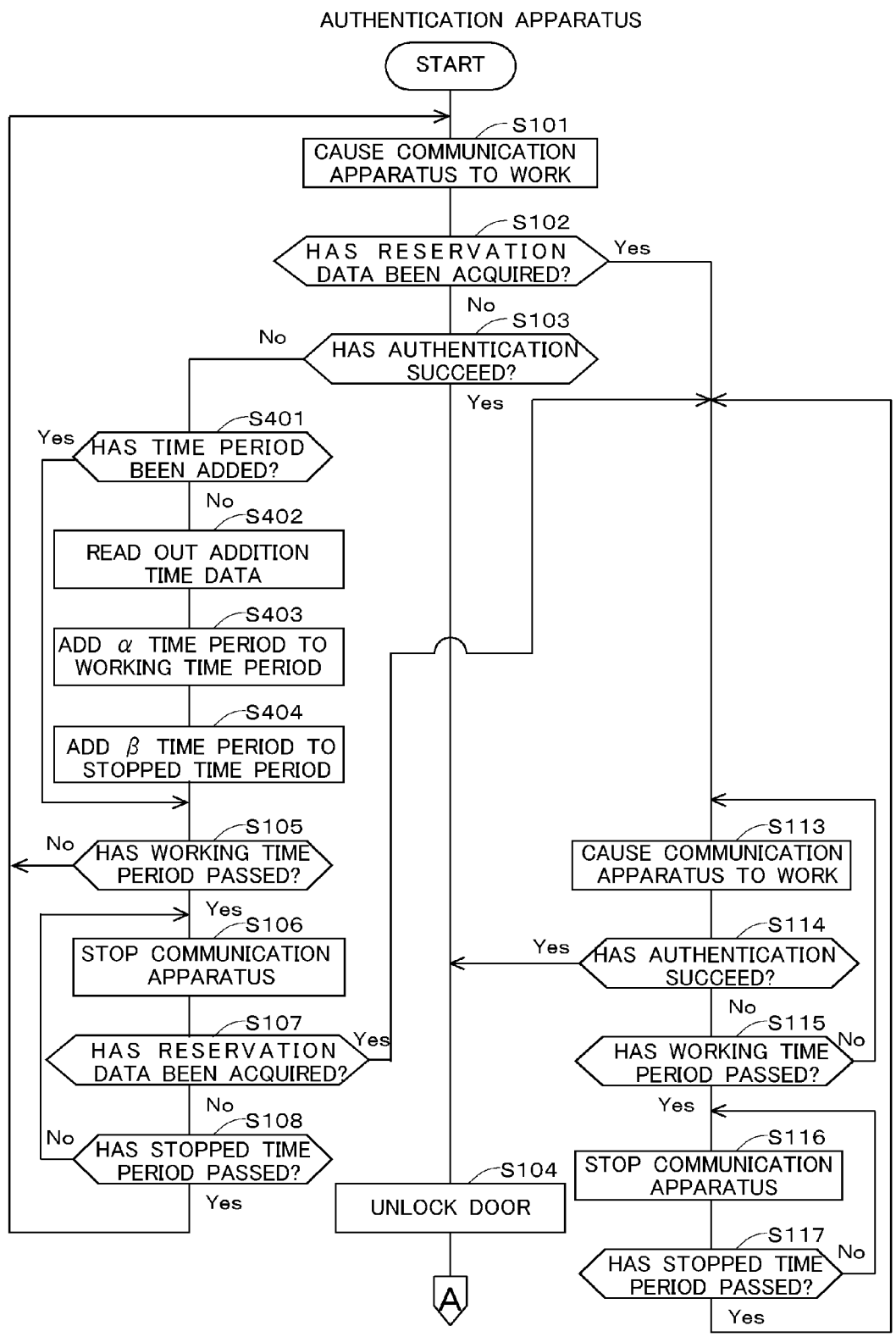
FIG. 11 illustrates steps of a process performed by the authentication apparatus in the third embodiment.

FIG. 11 illustrates a flowchart showing steps of a process performed by the authentication apparatus 3 in the third embodiment. The steps of the process in the third embodiment further include steps S401 to S404 as compared to the steps of the process in the first embodiment. Therefore, the steps S401 to S404 will be mainly described blew.

In the case where an authentication part 31d determines that the authentication has failed in the step S103 (No in the step S103), a timer 31c determines whether or not additional time periods have been added to the working time period and the stopped time period (the step S401).

The timer 31c determines that the additional time periods have not been added to the working time period and the stopped time period (No in the step S401), the timer 31c reads out the addition time data 33e from the memory 33 (the step S402).

Once reading out the addition time data 33e from the memory 33, the timer 31c adds an α time period, as the additional time period, to the working time period (the step S403), and a β time period, the additional time period, to the stopped time period (the step S404). The α time period and the β time period to be added as the additional time periods are, for example, five minutes and ten minutes.

Once the timer 31c adds the β time period, as the additional time period, to the stopped time period or once the timer 31c determines that the additional time periods have been added to the working time period and the stopped time period in the step S401 (Yes in the step S401), the step 105 and after are performed. After that, the authentication communication apparatus 4 is caused to work and to stop in a time cycle added with the additional time periods. In other words, the authentication communication apparatus 4 is caused to work at an interval longer by the additional time period, as compared to the interval between the adjacent working time periods in the case where the reservation data has not been acquired.

As described above, in the case where the reservation data has not acquired, the authentication apparatus 3 in the third embodiment adds the additional time periods to the working time period and the stopped time period. Therefore, in a case where there is no schedule of using the vehicle 2, more consumed power can be reduced. Even if the schedule is changed and the vehicle 2 is used, since the authentication communication apparatus 4 is not completely stopped, authentication can be performed.

4. Modifications

The invention is not limited to the foregoing embodiments, but various modifications are possible. Examples of other modifications will be described below. Any form of the embodiments described above and the modifications described below may be arbitrarily combined with one another.

In the foregoing embodiments, the interval between the adjacent working time periods of the authentication communication apparatus 4 is shortened as the scheduled time approaches by changing the interval pattern data set P according to the remaining time period 331c until the reserved use start time. When the interval is shortened, the working time period and the stopped time period are the same in each of the plurality of interval pattern data sets P. However, the working time period and the stopped time period may not be the same.

Figure 14:
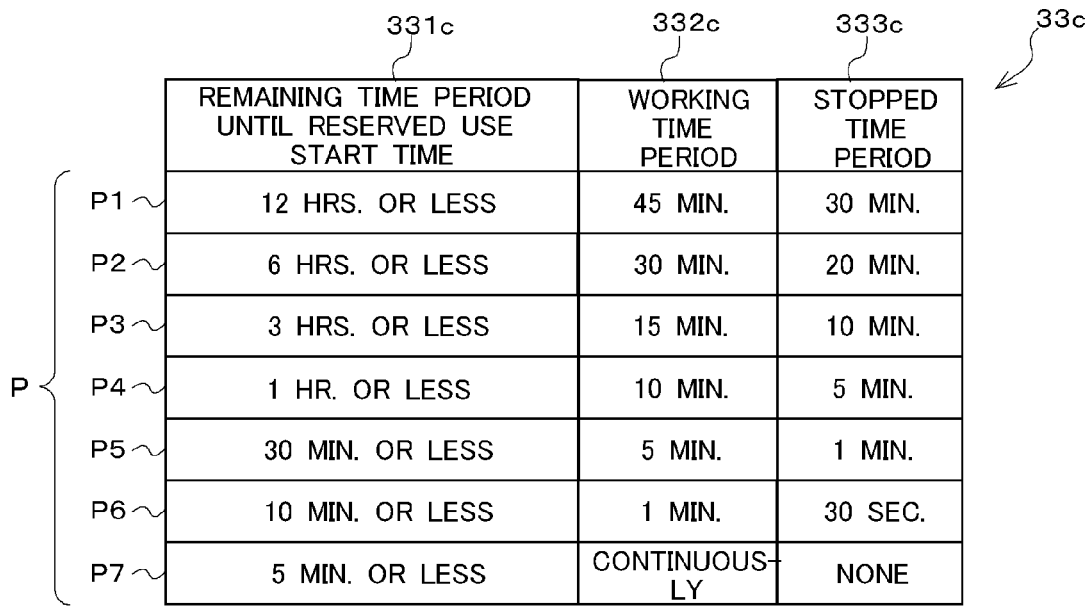
FIG. 14 illustrates an example of a modified interval table.

Each of FIG. 12 to FIG. 14 illustrates an example of the modified interval table 33c. As shown in FIG. 12, a working time period 332c may be constant, for example, three minutes, for all of the interval pattern data sets P, and only the stopped time period 333c may be shortened according to a remaining time period 331c. In a case where the working time period 332c is constant, stable authentication can be performed.

On the other hand, as shown in FIG. 13, the stopped time period 333c may be constant, for example, three minutes, for all of the interval pattern data sets P, and only the working time period 332c may be shortened according to the remaining time period 331c. In a case where the stopped time period 333c is constant, a stable amount of power is consumed.

As shown in FIG. 14, time periods for the working time period 332c and the stopped time period 333c may be different. For example, as shown in the interval pattern data set P1 in FIG. 14, in a case where the remaining time period 331c until the reserved use start time is 12 hours or less, the working time period may be 45 minutes and the stopped time period may be thirty minutes. The working time period and the stopped time period are flexibly set according to use frequency based on a parking region of the vehicle 2 and the season so that power consumption is effectively reduced.

The working time period 332c and the stopped time period 333c may be shortened in proportion to the remaining time period 331c. In other words, shortening rate may be changed.

As the reserved use start time approaches, an interval between the adjacent working time periods of the authentication communication apparatus 4 can be shortened by a method using the examples of the modified interval tables 33c shown in FIG. 12 to FIG. 14. Moreover, as a user comes closer to the vehicle 2, the authentication can be surely performed.

In the foregoing embodiments, as the scheduled time approaches, the interval between the adjacent working time periods of the authentication communication apparatus is shortened by changing the interval pattern data set P according to the remaining time period 331c until the reserved use start time. However, in a case where authentication is not performed even when the reserved use start time has arrived, the working time period 332c and the stopped time period 333c may be gradually lengthened according to elapsed time from the reserved use start time.

Figure 15:
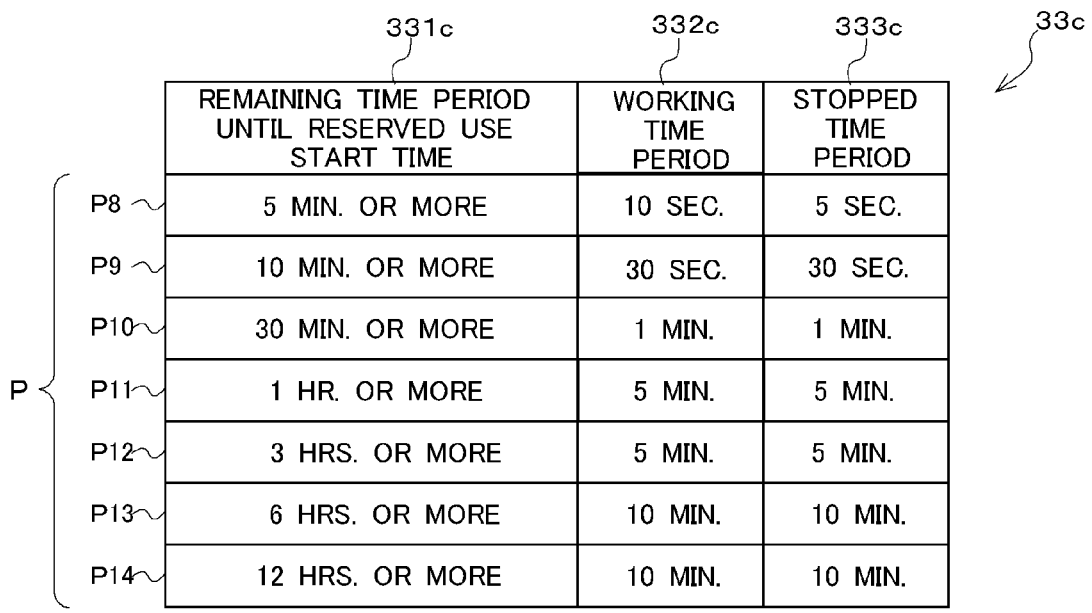
FIG. 15 illustrates an example of a modified interval table.

FIG. 15 illustrates an example of a modified interval table 33c for lengthening the working time period 332c and the stopped time period 333c according to an elapsed time period 334c from the reserved use start time. The interval table 33c in FIG. 15 includes interval pattern data sets P8 to P14. For example, in a case where the elapsed time period 334c from the reserved use start time is five minutes or more, the working time period 332c of ten seconds and the stopped time period 333c of five seconds are stored as the interval pattern data set P8. Moreover, in a case where the elapsed time period 334c from the reserved use start time is ten minutes or more, the working time period 332c of thirty seconds and the stopped time period 333c of thirty seconds are stored as the interval pattern data set P9. As described above, since the working time period 332c and the stopped time period 333c are lengthened according to the elapsed time period 334c, in the case where authentication is not performed even when the reserved use start time has arrived, as longer time has passed from the reserved use start time, i.e., as a possibility of no use of the vehicle 2 becomes higher, the working time period 332c and the stopped time period 333c are lengthened. Therefore, the convenience of the authentication apparatus 3 is enhanced while the consumed power is reduced.

The authentication communication apparatus 4 may be caused to work continuously in a predetermined time period from the reserved use start time because there is a high possibility that the user uses the vehicle 2 immediately in the predetermined time period from the reserved use start time. The predetermined time period is, for example, ten minutes.

In the foregoing embodiments, in the case where the reservation time data is stored, authentication is performed. However, even if reservation time data to use the vehicle 2 is not stored but in a case where the user ID number is stored, authentication may be performed. In this case, a user having a stored user ID number, i.e., an authorized user, may use a vehicle anytime even without reservation so that convenience is enhanced.

The "reserved use start time" in the foregoing embodiments may be time or may be a remaining time period until use start time.

In the foregoing embodiments, the authentication apparatus 3 includes the interval table 33c. However, a server 6 may include the interval table 33c. The server 6 may give an instruction of the working time period 332c and the stopped time period 333c to the authentication apparatus 3. In this case, a capacity of the memory 33 included in the authentication apparatus 3 may be saved.

In the foregoing embodiments, the vehicle 2 is a taxi, a truck, or construction machinery. However, the vehicle 2 may be a vehicle that travels in a short distance for shopping, commuting or sightseeing.

In the foregoing embodiments, the reservation system 51 receives the request of the reservation to use the vehicle 2 from the user. The user may visit the office 5 to make the request of the reservation to use the vehicle 2 with the reservation system 51. Moreover, the user may communicate contents of the reservation to staff of the office 5 over phone or via an email, using the mobile device 7, and then the staff of the office 5 may input the reservation with the reservation system 51. Further, the user may use the mobile device 7 to operate the reservation system 51 via wireless communications.

In the foregoing embodiments, in the case where the unlocking part 31e looks up the authentication flag and determines that the authentication flag is on, the unlocking part 31e unlocks the door of the vehicle 2. Once the unlocking part 31e determines that the authentication flag is on, the unlocking part 31e may unlock a lock of a steering wheel, unlock the luggage door and/or start of an engine of the vehicle 2, in addition to unlocking the door of the vehicle 2.

In the third embodiment, in the case where the reservation data has been acquired, the additional time period is added to the working time period and the stopped time period. However, the additional time period may not be added to the working time period and the stopped time period. In the case where the reservation data has not to acquired, the additional time period may be subtracted from the working time period and the stopped time period. In this case, too, in a case where the scheduled time has been acquired, the operation part 31a causes the authentication communication apparatus 4 to work using the first interval and in a case where the scheduled time has not been acquired, the operation part 31a causes the authentication communication apparatus 4 to work using the second interval that is longer than the first interval.

In the foregoing embodiments, the object to be reserved to use is a vehicle, such as a car. However, the vehicle may be a motorcycle, a train, an airplane, a ship, a boat or other transport machinery besides a vehicle. The vehicle includes a vehicle for civilian use and for military use, and a vehicle for private use and for business use. Moreover, the object is installed not only on the vehicle but also on an elevator or an escalator and another lift. In short, the object may be anything for which a reservation can be made to use and that requires authentication of a user.

In the third embodiment, the addition time data 33e is time data for lengthening the working time period and the stopped time period of the authentication communication apparatus 4, and the addition time data 33e may be five minutes, for example. However, the addition time data 33e may not be five minutes. The addition time data 33e may be changed depending on the remaining time period 331c until the reserved use start time. For example, the addition time data 33e may be ten minutes in a case where the remaining time period 331c until the reserved use start time is twelve hours or less and six hours or less. Similarly, in a case where the remaining time period 331c is three hours or less and one hour or less, the addition time data 33e may be five minutes. Similarly, in a case where the remaining time period 331c is thirty minutes or less and ten minutes or less, the addition time data 33e may be one minute.

In the foregoing embodiments, the function described as one block is not necessarily implemented by a single physical element, but may be implemented by separate physical elements. In the foregoing embodiments, the function described as a plurality of blocks may be implemented by a single physical element. Further, a process relating to one arbitrary function may be shared and implemented by apparatuses inside and outside the vehicle, and the function may be implemented as a whole by exchanging information via communications between those apparatuses. For example, the authentication apparatus 3 and the authentication communication apparatus 4 may be realized by one constituent element. Further, the office 5 and the server 6 may be realized by one constituent element.

Moreover, in the foregoing embodiments, the configuration described as hardware may be implemented by software, and a function described as software may be implemented by hardware. Also, a function of hardware or software may be implemented by the cooperation of software and hardware.

While the invention has been shown and described in detail, the foregoing description is in all aspects illustrative and not restrictive. It is therefore understood that numerous other modifications and variations can be devised without departing from the scope of the invention.

What is claimed is:

1. An authentication apparatus comprising:
a transceiver that performs wireless communications via an antenna; and
a controller configured to:
cause the transceiver to operate intermittently by setting a working time period of the transceiver, the transceiver seeking to obtain verification data of a user during the working time period; and
acquire a scheduled use start time of an object associated with the authentication apparatus, the user seeking to use the object, wherein
the controller changes an interval between adjacent working time periods of the transceiver depending on whether or not the scheduled use start time has been acquired by the controller.

2. The authentication apparatus according to claim 1, wherein
in a case where the scheduled use start time has been acquired by the controller, the controller shortens the interval between the adjacent working time periods of the transceiver as the scheduled use start time approaches.

3. The authentication apparatus according to claim 1, wherein
in a case where the scheduled use start time has not been acquired by the controller, the controller sets the interval between the adjacent working time periods of the transceiver to a constant time period.

4. The authentication apparatus according to claim 1, wherein
in a case where the scheduled use start time has been acquired by the controller, the controller causes the transceiver to operate continuously, and
in a case where the scheduled use start time has not been acquired by the controller, the controller causes the transceiver to operate intermittently.

5. The authentication apparatus according to claim 1, wherein
in a case where the scheduled use start time has been acquired by the controller, the controller causes the transceiver to operate using a first interval, and
in a case where the scheduled use start time has not been acquired by the controller, the controller causes the transceiver to operate using a second interval longer than the first interval.

6. The authentication apparatus according to claim 1, wherein
the controller sets the working time period and a non-working time period of the transceiver.

7. An authentication method comprising the steps of:
(a) performing wireless communications via an antenna of a transceiver to obtain verification data by which to verify a user of an object associated with an authentication apparatus that has the transceiver;
(b) causing, by a controller of the authentication apparatus, the transceiver to operate intermittently by setting a working time period of the transceiver; and
(c) acquiring, by the controller, a scheduled use start time of the object, wherein
the step (b) changes an interval between adjacent working time periods of the transceiver depending on whether or not the scheduled use start time has been acquired by the controller.

8. The authentication method according to claim 7, wherein
in a case where the scheduled use start time has been acquired by the controller, the step (b) shortens the interval between the adjacent working time periods of the transceiver as the scheduled use start time approaches.

9. The authentication method according to claim 7, wherein
in a case where the scheduled use start time has not been acquired by the controller, the step (b) sets the interval between the adjacent working time periods of the transceiver to a constant time period.

10. The authentication method according to claim 7, wherein
in a case where the scheduled use start time has been acquired by the controller, the step (b) causes the transceiver to operate continuously, and in a case where the scheduled use start time has not been acquired by the controller, the step (b) causes the transceiver to work intermittently.

11. The authentication method according to claim 7, wherein
in a case where the scheduled use start time has been acquired by the controller, the step (b) causes the transceiver to operate using a first interval, and
in a case where the scheduled use start time has not been acquired by the controller, the step (b) causes the transceiver to operate using a second interval longer than the first interval.

12. The authentication method according to claim 7, wherein
the step (b) sets the working time period and a non-working time period of the transceiver.

13. An authentication system that includes an authentication apparatus and a server, wherein
the server includes:
a memory in which is stored information about a user who desires to use an object and a scheduled use start time by the user of the object;
a transmitter that sends, to the authentication apparatus, user data about the user and the scheduled use start time, and
the authentication apparatus includes:
a controller that acquires the user data and the scheduled use start time from the server; and
a transceiver that performs wireless communication via an antenna to obtain verification data that is used to verify the user based on the user data, wherein
the controller causes the transceiver to operate intermittently by setting a working time period of the transceiver, the transceiver operating during the working time period, and
the controller changes an interval between adjacent working time periods of the transceiver depending on whether or not the scheduled use start time has been acquired by the controller.

14. The authentication system according to claim 13, wherein
in a case where the scheduled use start time has been acquired by the controller, the controller shortens the interval between the adjacent working time periods of the transceiver as the scheduled use start time approaches.

15. The authentication system according to claim 13, wherein
in a case where the scheduled use start time has not been acquired by the controller, the controller sets the interval between the adjacent working time periods of the transceiver to a constant time period.

16. The authentication system according to claim 13, wherein
in a case where the scheduled use start time has been acquired by the controller, the controller causes the transceiver to operate continuously, and
in a case where the scheduled use start time has not been acquired by the controller, the controller causes the transceiver to operate intermittently.

17. The authentication system according to claim 13, wherein
in a case where the scheduled use start time has been acquired by the controller, the controller causes the transceiver to operate using a first interval, and
in a case where the scheduled use start time has not been acquired by the controller, the controller causes the transceiver to operate using a second interval longer than the first interval.

18. The authentication system according to claim 13, wherein
the controller sets the working time period and a non-working time period of the transceiver.

19. A non-transitory computer-readable recording medium that stores a program to be executed by a computer to perform authentication, the program causing the computer to execute the steps of:
(a) performing wireless communications via an antenna of a transceiver associated with the computer to obtain verification data by which to verify a user of an object associated with the computer;
(b) causing the transceiver to operate intermittently by seeking a working time period of the transceiver; and
(c) acquiring a scheduled use start time of the object, wherein
the step (b) changes an interval between adjacent working time periods of the transceiver depending on whether or not the scheduled use start time has been acquired by the computer.

20. The non-transitory computer-readable recording medium according to claim 19, wherein
in a case where the scheduled use start time has been acquired by the computer, the computer shortens the interval between the adjacent working time periods of the transceiver as the scheduled use start time approaches.

* * * * *